United States Patent [19] [11] 3,896,288
Tulkoff [45] July 22, 1975

[54] METHOD OF HEAT-SHRINK WRAPPING GOODS

[76] Inventor: Martin J. Tulkoff, 3404 Shelburne Rd., Baltimore, Md. 21208

[22] Filed: Mar. 26, 1973

[21] Appl. No.: 344,774

Related U.S. Application Data

[63] Continuation-in-part of Ser. No. 254,548, May 18, 1972, Pat. No. 3,723,708.

[52] U.S. Cl. ............................ 53/30; 13/22; 34/202; 53/184; 219/354; 219/385; 219/411; 264/230
[51] Int. Cl.² ....................... B65B 53/02; H05B 1/00
[58] Field of Search ............. 53/24, 30, 77, 184, 25, 53/30 S, 127, 112, 184 S; 219/342, 345, 348, 349, 354, 385, 388, 420, 521, 535, 347–354; 264/22, 25, 230, 342 R, DIG. 71, 234, 235; 156/380; 266/5 B; 13/20, 22; 432/225, 226; 34/4, 39, 40, 60, 201, 202

[56] References Cited
UNITED STATES PATENTS

| | | | |
|---|---|---|---|
| 1,739,958 | 12/1929 | Farmer | 13/22 X |
| 2,131,591 | 9/1938 | Keith et al. | 13/22 |
| 2,729,733 | 1/1956 | Heron | 219/535 |
| 2,848,591 | 9/1958 | Taylor | 219/352 |
| 2,947,843 | 8/1960 | Burman et al. | 219/420 X |
| 2,963,567 | 12/1960 | Roth | 219/521 X |
| 3,012,125 | 12/1961 | Woolhouse | 219/385 |
| 3,016,443 | 1/1962 | Fliczar et al. | 219/385 |
| 3,156,812 | 11/1964 | Forman et al. | 219/388 |
| 3,239,651 | 3/1966 | Silberman | 219/388 |
| 3,275,799 | 9/1966 | Meltzer | 219/342 |
| 3,283,469 | 11/1966 | McBrady et al. | 53/184 X |
| 3,312,811 | 4/1967 | Shanklin | 219/388 |
| 3,316,689 | 5/1967 | Waldrop et al. | 53/184 |
| 3,325,629 | 6/1967 | Shelby | 219/348 |
| 3,410,048 | 11/1968 | Gottily et al. | 53/77 |
| 3,493,724 | 2/1970 | Wells | 219/345 |
| 3,501,886 | 5/1970 | Watts, Jr. et al. | 219/354 X |
| 3,526,752 | 9/1970 | Bell | 219/388 |
| 3,581,458 | 6/1971 | Gustavsson | 53/184 S |
| 3,581,458 | 6/1971 | Gustavsson | 53/30 |
| 3,589,102 | 6/1971 | Zelnick | 53/184 |
| 3,591,767 | 7/1971 | Mudie | 53/184 S |
| 3,662,512 | 5/1972 | Zelnick | 53/30 |
| 3,710,550 | 1/1973 | Osborne | 53/184 |
| 3,723,708 | 3/1973 | Tulkoff | 219/385 |
| 3,807,126 | 4/1974 | Schwarz | 53/30 |
| 3,818,182 | 6/1974 | Linde | 53/30 S |
| 3,831,340 | 8/1974 | Tulkoff | 53/24 |
| R25,466 | 10/1963 | Kostur | 53/184 X |

FOREIGN PATENTS OR APPLICATIONS

| | | | |
|---|---|---|---|
| 137,958 | 7/1960 | U.S.S.R. | 219/388 |
| 2,082,861 | 12/1971 | France | 53/184 S |

OTHER PUBLICATIONS

Die Verpackung, VEB Fachbuchverlag Leipzig-Verlagspostamt Berlin, 4, July–August 1970, pp. 116–119, (copy in 210).

*Primary Examiner*—A. Bartis
*Attorney, Agent, or Firm*—Oblon, Fisher, Spivak, McClelland & Maier

[57] ABSTRACT

There is disclosed a method of heat shrinking a heat-shrinkable plastic wrapping film about a loaded pallet. The goods on the pallet are covered with the film to embrace and retain the goods in a desired condition when the film is shrunk therearound. The film-wrapped goods are placed in alignment with an open wall of an otherwise wall-enclosed housing. The air within the wall-enclosed housing is heated to a heat-shrink temperature with the air being maintained in a substantially quiescent state. While the air is in the heated quiescent state, movement is imparted to at least one of the goods and wall-enclosed housing whereby the film-wrapped goods pass through the open wall to be essentially enclosed by the wall-enclosed housing thereby causing the film to shrink about the goods.

1 Claim, 10 Drawing Figures

METHOD OF HEAT-SHRINK WRAPPING GOODS

This is a continuation-in-part application to my application Ser. No. 254,548, filed May 18, 1972, now U.S. Pat. No. 3,723,708, issued Mar. 27, 1973.

BACKGROUND OF THE INVENTION

This invention relates to a device for the handling of goods stored on a supporting pallet, and particularly to a device for heating a loaded pallet wherein the goods thereon have been enveloped by a substantially conforming plastic film.

It is common practice to store and otherwise handle stacks of goods while supported on pallets. When the pallets are to be kept outdoors or are otherwise surrounded by an atmosphere which may damage the stacked material, plastic covers have been employed heretofore for protecting the stored goods.

It is also known to protect stored goods by enclosing the goods in loosely fitting bags of heat-shrinkable plastic film, which is a staple article of commerce, and then to expose the bags to heat sufficient to cause shrinkage of the bags into conforming engagement with the goods. This method has been employed heretofore for securing several stored objects in a fixed spatial relationship by a common envelope of shrunken film. The exposure to heat is usually accomplished by what is known as a heat tunnel which is provided with a conveyor means to move the loaded pallet into the tunnel at one end thereof and to move it out at an opposite end. The dwell time in the tunnel is controlled by the speed of the conveyor. In such prior art devices, the electric energy consumption is of a very high magnitude. This is due to the fact that the heating elements are operated intermittently so that heat output is chiefly by direct radiation.

In other prior art devices, the enclosed loaded pallet is heated only in certain areas at a time. Such heating is accomplished by blasting the areas with a stream of hot air.

SUMMARY OF THE INVENTION

The device of the present invention includes advantageously a rectangularly-shaped housing having closed end walls, side walls and top. The housing has an open bottom. The housing has mounted internally along the lower portion of each wall either elongated horizontally disposed electric heating elements or a plurality of substantially polygonal electric heating elements. The elongated elements are of sufficient length to have a dimension which is at least as long as a major horizontal dimension of the wall to which it is affixed. The side walls also possess elongated horizontally disposed electric heating elements along the upper portion of each side wall or a plurality of substantially polygonal electric heating elements. To provide directed heat radiation each of the heating elements are spaced from their respective walls and are provided with reflectors which direct the radiation produced in the most efficacious even manner.

The housing in one embodiment is suspended from a suitable means as from a forklift truck or mounted by suitable means to a hydraulic means, or by mechanical linkage means. When it is in use the housing may rest on its downwardly facing leading edge on the floor or the like and still maintain the temperature needed.

In use the goods which may be in boxes are supported on an upwardly directed face of a pallet. At least a major portion of the goods are covered with a bag of heat shrinkable plastic film substantially conforming to the goods and to part of the pallet if the bag is sufficiently large for this purpose. The application of the bag is simply carried out by employing a bag of heat shrinkable plastic film having an open bottom end and a rim portion about the opening in the bottom end which is pulled downward over the goods and a portion of the pallet.

The bag may be applied to the pallet at a position remote from the housing and then transported to a position so that it resides directly underneath the housing which has been positioned in a raised condition without danger of burning oneself. The transportation may be conveniently carried out with a forklift truck or any other convenient mode. On the other hand, the bag may be applied to the goods on the pallet while it is already in position underneath the housing.

Once the loaded pallet has been properly encased and positioned beneath the housing, the preheated housing is lowered over the so-enclosed loaded pallet. Suitable switch controlling means senses the fact that the housing has completed its descent. A timer which has been preset to control the dwell time of the enclosed loaded pallet is advantageously employed. At the conclusion of the heat shrinking step, the housing is raised to permit ready access to the loaded pallet which may be removed by conventional means.

DETAILED DESCRIPTION OF THE INVENTION

Figure 1:
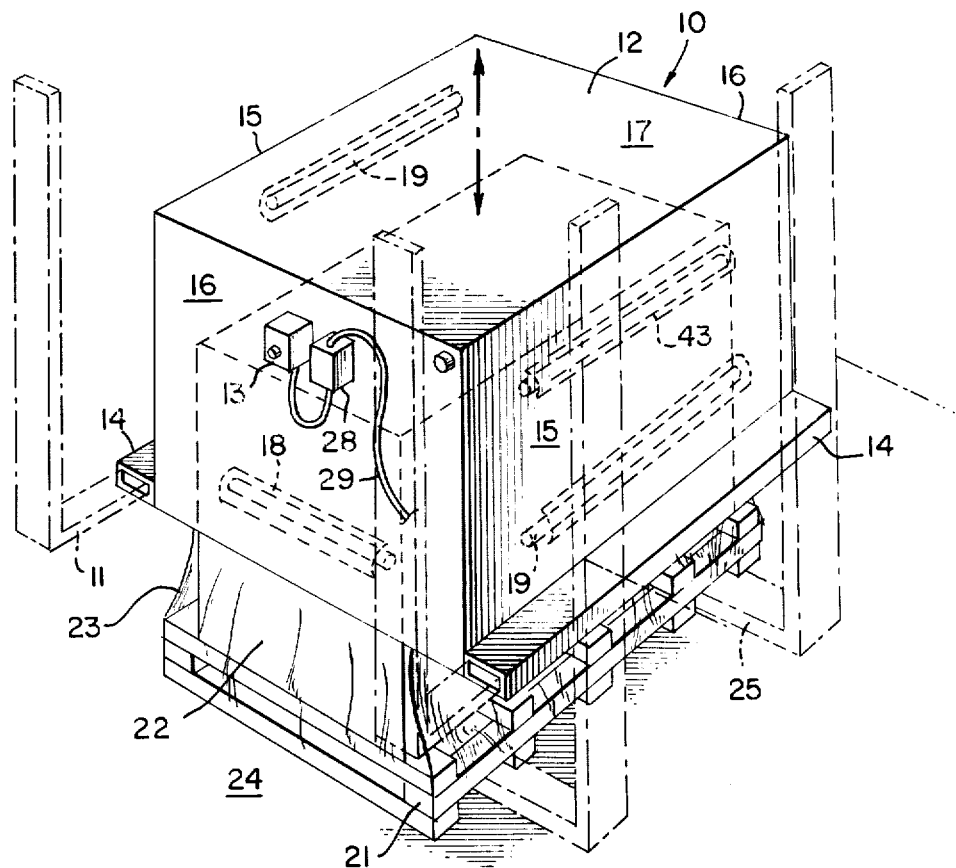
FIG. 1 is a perspective view of the device of the present invention with a bag enclosed loaded pallet partially encompassed by the housing.

Turning to the drawings, especially to FIG. 1, reference numeral 10 is to the device of the present invention. Suspended by the tines 11 of a forklift truck (not shown) is a housing 12, which is an oven.

The housing 12 has side walls 15 and end walls 16. A top 17 completes the housing. It does not possess a bottom as this would defeat its unique utilizability. The walls and top are constructed of sheet metal, for instance. Preferably the construction as clearly shown in the broken away portion of FIG. 3 is of the sandwich type with outer and inner lamina of sheet metal and a core of suitable insulation material, such as asbestos or fiberglass.

Inside each of the inner end walls 16 is an elongated electric heating element 18, shown by dotted lines. The element 18 is positioned along the lower portion of the wall. The longest dimension of the heating element is such that it bridges a major portion of the width of the end wall. Further, inside each of the side walls 15 are two elongated electric heating elements 19 shown by dotted lines in FIG. 1. Two of the heating elements 19 are positioned in approximately the same horizontal plane as the heating elements 18 of the end walls 16. Each of the other heating elements are secured to the inner side wall at the upper portion thereof. The heating elements 19 on each side wall are parallel to one another. Additionally, they are of a length so that each bridges a major portion of the width of the side wall 15.

From FIG. 1 it will be seen that a pallet 21 having a load 22 thereon with a heat shrinkable bag 23 positioned over the load has been located on the floor 24 by forklift tines 25 shown by dotted lines. The housing 12 is lowered over the loaded pallet by operation of another forklift truck the tines 11 of which pass into horizontally positioned channels 14 located along the side walls 15.

Figure 3:
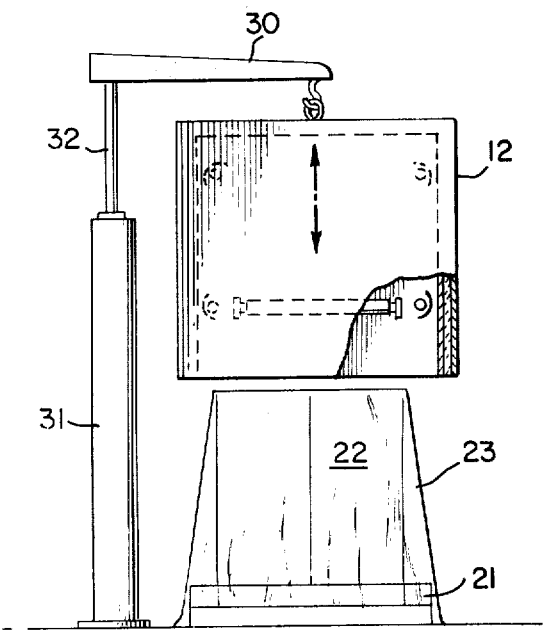
FIG. 3 is a side view partially in cross section of the housing illustrating another suspending means with the housing in the ascended position.

In the embodiment shown in FIG. 3, it will be seen that the housing 12 is suspended from one end of a horizontal member 30. The other end is supported by a hydraulic means 31 which is positioned so that the cylinder thereof is vertical and its rod 32 has one end secured to the other end of the horizontal member. The housing 12 may be raised to a height somewhat higher than the pallet 21 bearing a load 22 which is enveloped with a thermoplastic bag 23.

Figure 4:
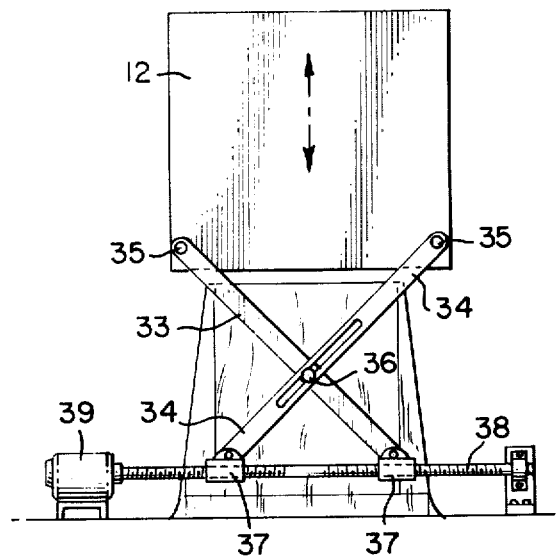
FIG. 4 is a side elevational view of still another embodiment of a suspending means for the housing.

In the embodiment shown in FIG. 4, the housing is supported by a scissor linkage means 33. The scissor linkage means 33 comprises two elongated members 34 having the ends thereof pivotally secured at 35 to near the bottom corners of end wall 16, for instance. The two elongated members 34 cross each other at 36 and are slidably secured to each other. The other ends of elongated members 34 terminate in internally threaded means 37 mounted about a worm gear 38. The worm gear is suitably mounted and journalled. It is driven by electric motor 39. It will be appreciated, that driving worm gear 38 in one direction will move means 37 together and thereby raise the housing. When means 37 are driven apart the housing is thereby lowered.

Figure 5:
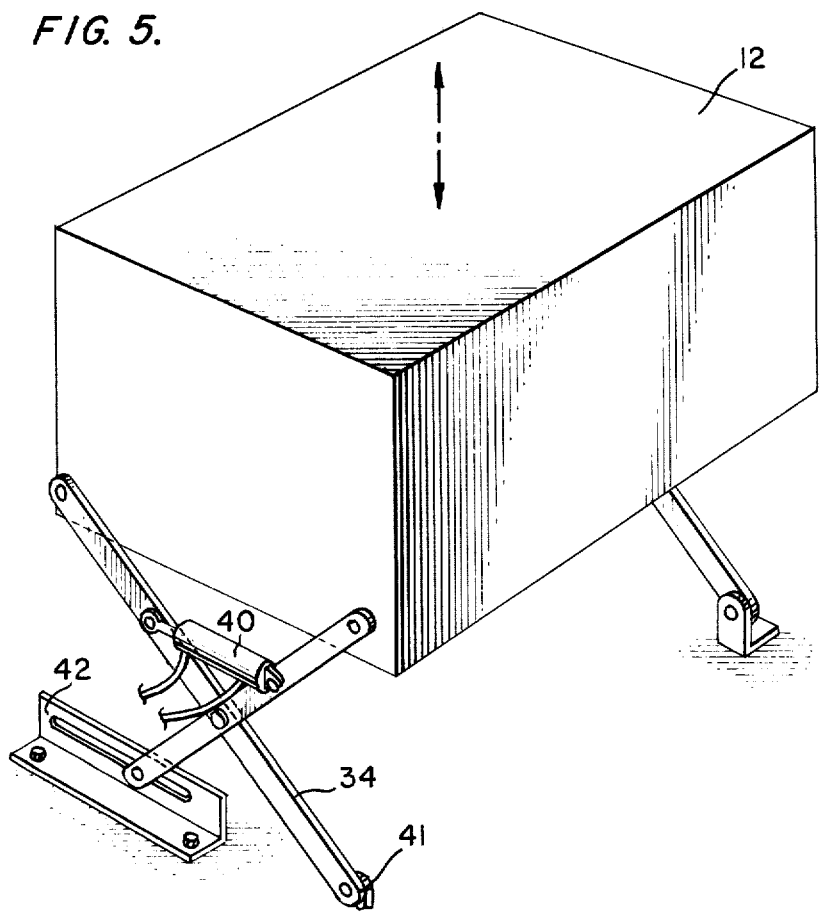
FIG. 5 is a perspective view of yet another embodiment of a suspending means for the housing.

In the embodiment of FIG. 5, the housing 12 is equipped with similar elongated members 34 which are pivotally secured to the corner portions of the housing as heretofore. In this embodiment the members 34 are operated by a hydraulic means 40 which draw members 34 either together to raise the housing 12 or to separate them to lower them. One of the lower ends of member 34 is pivotally mounted at 41. The other end is pivotally and slidably secured to retaining means 42.

With regard to the embodiments of FIGS. 4 and 5, it will be necessary to provide similar suspending means on both sides as can be especially seen from FIG. 5.

It will be appreciated that other mechanical modes will come to mind to those skilled in the art. Consequently, it is contemplated that other such means are within the purview of the inventive concept. The means shown are merely by way of illustration.

In the embodiment of FIGS. 3, 4 and 5 the raising and lowering means have suitable sensing switches designed to stop the operation when the housing is in its uppermost raised position and when it has come to its lowermost position, that is when it has come to rest on the floor 24 for instance. Switches are also at a control station for reversing the movement of the housing either at the end of the uppermost position or at the lowermost position or at any intermediate position. The control station may be secured to the housing 12 or at 13 on the end wall 16. Additionally, the control station possesses a selective timer device whereby the period of time when the housing is in the lowermost position can be controlled by presetting the time.

In operation the electric heating elements are activated at a time sufficiently prior to utilization. The heating elements advantageously employ low electric energy requirements of between 8 and 20 KW, preferably 10.6 KW. In view thereof, it is desirable to preheat the housing to an ambient temperature of approximately 250°F. A thermostatically operated switch 28 is located in the housing to control a desirable preselected temperature level. The electricity is supplied to the heating elements by a flexible conduit 29 shown in fragmentary form.

In FIG. 1 the housing is shown in partial ascent or descent. It has been found that with a preset temperature of about 250°F., and heating elements drawing about 10.6 KW, a dwell time of 3 to 5 minutes is sufficient to bring the heat shrinkable bag to a temperature which enables it to be shrunk tightly about the load. The dwell time will be at the upper period of time when the loaded pallet contains a load of refrigerated goods. It will be seen that the housing is of sufficient size to permit spacing of the housing about the loaded pallet.

FIG. 1 illustrates the housing 12 in a partially raised position over a positioned pallet having a heat shrinkable bag pulled over the loaded pallet; the load being a plurality of boxes and the housing descending over the load. The tines 11 of the forklift truck support the housing 12 by being inserted into channels 14 on each side wall 15 of the housing. The forklift employed may be the same one used to deliver the loaded bag enclosed pallet or two forklifts may more preferably be employed. When one is employed, it will be noted that the housing 12 will have to be set aside and then moved into position for use.

Figure 2:
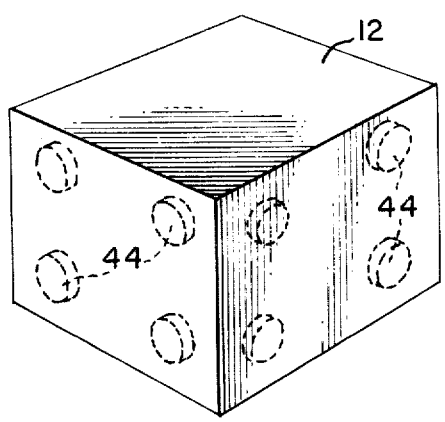
FIG. 2 is a perspective view of the housing showing in dotted lines another embodiment of the electric heating elements.

FIG. 1 also shows the housing with the heating elements which have concave heat reflectors 43 therebehind. The heat reflector 43 is constructed of an elongated concave sheet metal and is positioned to direct the reflected heat rays in a general upward direction in the direction of the bag 23, as shown. With regard to the heating elements secured to the upper portion of the side walls 15, the reflectors are positioned to direct the rays in a somewhat downward direction. It will be seen that the reflectors are located between the heating elements and the walls of the housing. In FIG. 2 the electric heaters 44 are circular but the electric energy requirement is the same as in the other embodiment.

In the foregoing, the housing 12 was described as being movable vertically to enclose the loaded pallet. It will be seen that in FIGS. 6 and 7 the housing is secured to an I-beam 51 for instance which is secured to a ceiling 52. The housing may be secured thereto by any conventional manner as by bolts or welding.

Figure 6:
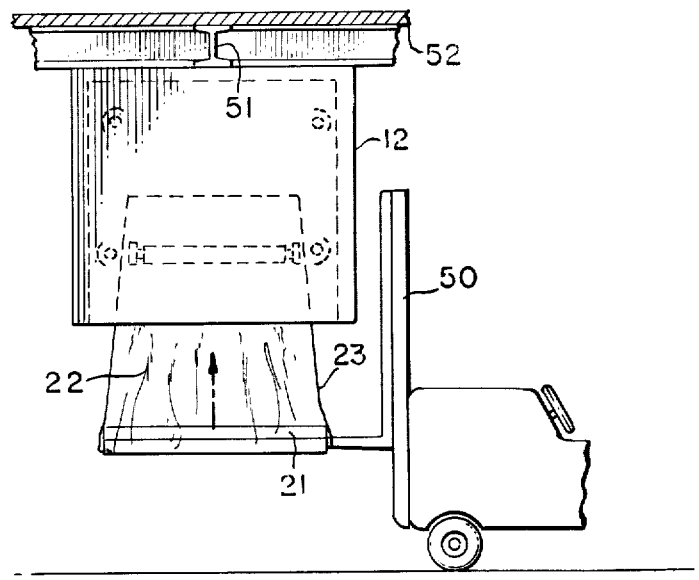
FIG. 6 is a side elevational view depicting the housing attached to the ceiling and the loaded pallet is raised thereinto.

In the embodiment depicted by FIG. 6, the housing is secured to the I-beam above the floor. A forklift truck 50 is used not only to carry the bag enclosed pallet into position horizontally, but is then also employed to raise the thusly loaded pallet up into the oven for the heat treatment.

Figure 7:
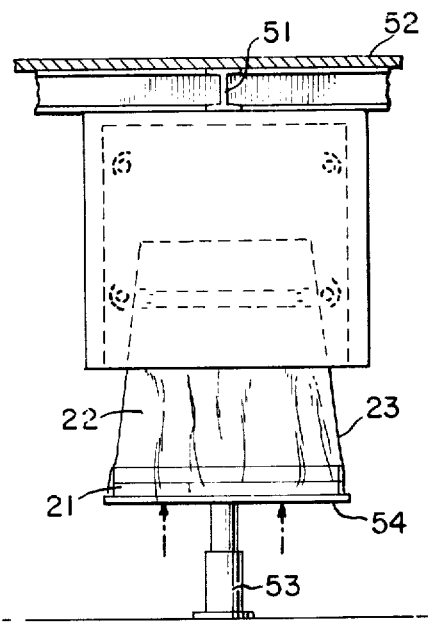
FIG. 7 is a side elevational view of another embodiment similar to FIG. 6.

In the embodiment illustrated by FIG. 7, the loaded pallet is positioned onto a hydraulically lifted platform 54 which is operated by hydraulic cylinder 53. The platform 54 is raised up into the housing 12 to carry forward on the heat shrinking step.

Figure 8:
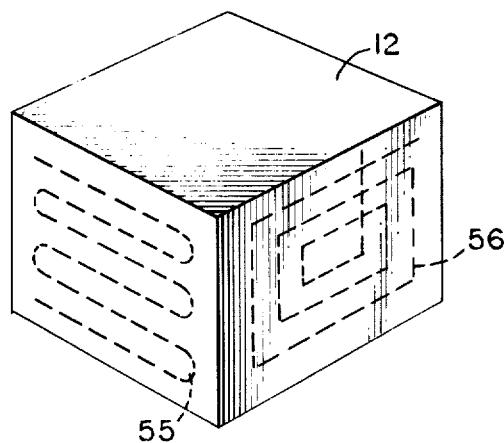
FIG. 8 is a perspective view of the housing having different embodiments of heating elements.

FIG. 8 is a perspective view of the housing 12, to be illustrative of the applicability of the use of different heating elements and the fact that a combination may be employed. Heating element 55 is to a convoluted wire type depicted by the dotted lines. While heating element 56 shows a helical type heating element.

Figure 9:
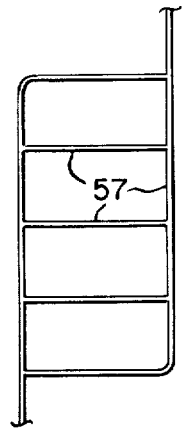
FIG. 9 is a top plan view of yet another embodiment of a heating element.
Figure 10:
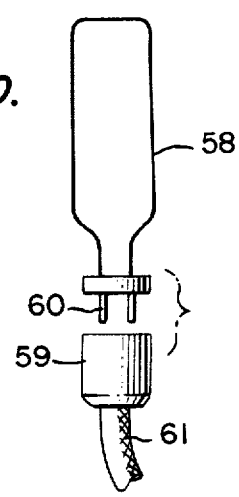
FIG. 10 is a top plan view of still another embodiment of a heating element.

In FIG. 9, a grid like heating element 57 is shown which may be used in place of the other heating elements discussed heretofore. In FIG. 10, a loop heating element 58 is described which may be used. All of the heating elements may in fact, of course, be used in the housing of the present invention. They may also be fitted with plug 60 and outlet means 59, in turn connected to an electric conduit 61 to a source. In this manner the heating elements may be easily removed when replacement is found to be necessary.

In the foregoing consideration of the invention, it should be appreciated that a great many advantages flow from the invention, some of which bear listing such as:

a. vertical operation of the housing or the goods
 b. closed housing except for the bottom to confine heat
 c. low energy requirements
 d. adjustability for
    1. dwell time
    2. temperature conditions
 e. automatic timing operation
 f. little or no floor space required
 g. heat shrinkable bag may be applied to the loaded pallet either in position or remote from the housing prior to transporting it thereto
 h. no need for adjustment of size of load as in prior art devices
 i. temperature control features are mounted directly on the housing
 j. no need for air curtains or vacuum to insure that heat shrinkable bag is confined tightly to load; downward movement of closed housing over load forces bag into proximity to the load.

What is claimed is:

1. A method of heat-shrink-wrapping goods with a heat-shrinkable film comprising the steps of:
 a. covering said goods with said film to embrace and retain the goods in a desired condition when the film is shrunken therearound;
 b. providing a wall-enclosed housing having one open wall to permit entrance of the goods;
 c. placing said film-wrapped goods in alignment with said wall-enclosed housing;
 d. heating the air within said wall-enclosed housing to a heat-shrink temperature such that said air is maintained in a substantially quiescent state; and while said air is in said heated quiescent state;
 e. imparting movement to at least one of said goods and wall-enclosed housing whereby said film-wrapped goods are esentially enclosed by said wall-enclosed housing.

* * * * *